Oct. 2, 1934.  M. B. MORGAN  1,975,553

BRAKE

Filed Oct. 25, 1930  2 Sheets-Sheet 1

INVENTOR
Mathew B. Morgan
HIS ATTORNEYS

Oct. 2, 1934.   M. B. MORGAN   1,975,553
BRAKE
Filed Oct. 25, 1930   2 Sheets-Sheet 2
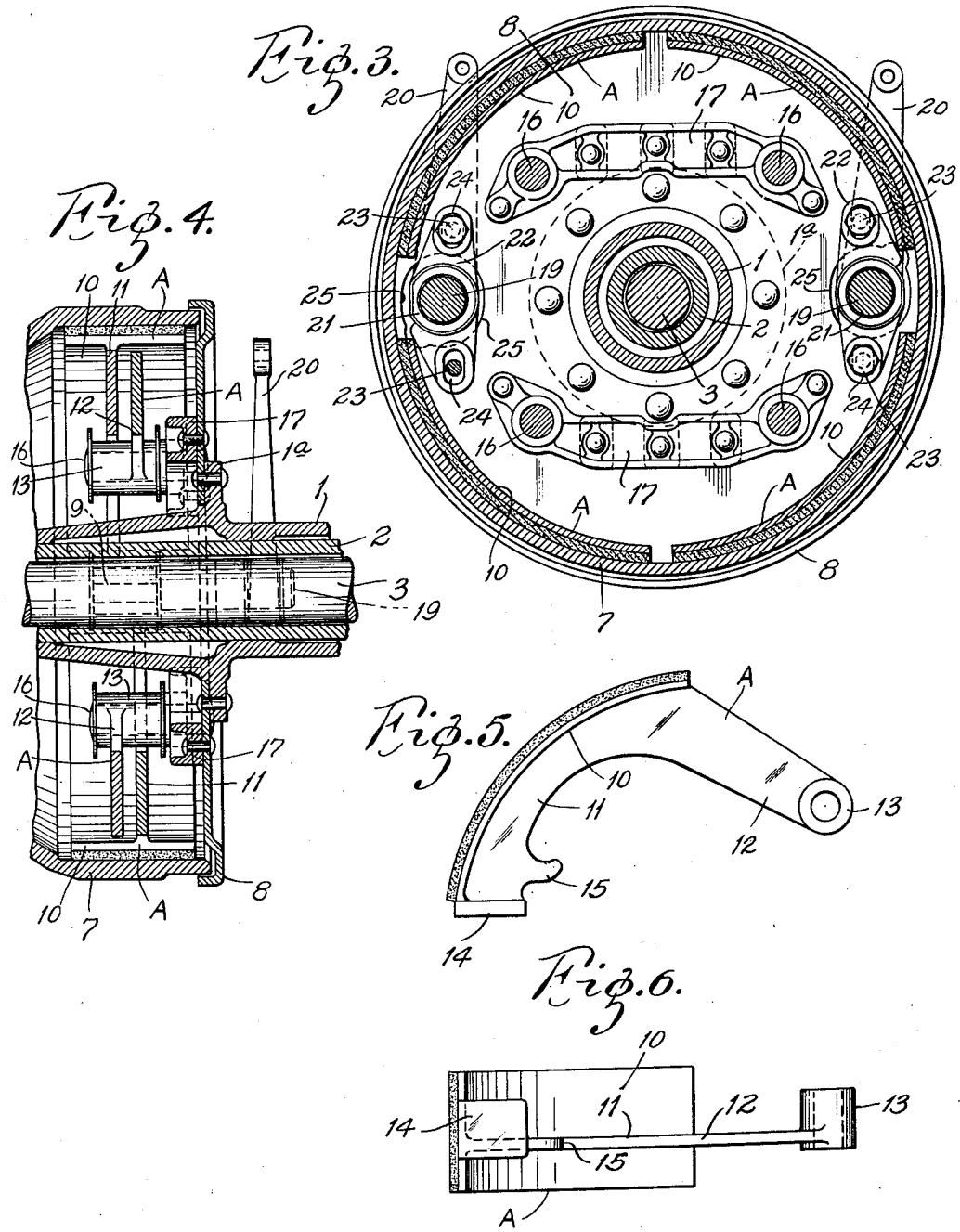
INVENTOR:
Mathew B. Morgan
HIS ATTORNEYS.

Patented Oct. 2, 1934

1,975,553

UNITED STATES PATENT OFFICE 1,975,553

BRAKE

Mathew B. Morgan, Detroit, Mich., assignor to The Timken-Detroit Axle Company, Detroit, Mich., a corporation of Ohio Application October 25, 1930, Serial No. 491,163

2 Claims. (Cl. 188—78)

This invention relates to brakes, particularly vehicle brakes of the type shown in Alden Patent No. 1,135,148, dated April 13, 1915, wherein two sets of separately operable brake shoes operate over substantially the same circumferential path on the brake drum.

The invention has for its principal objects to preserve all of the advantages and accomplish all of the functions of the above type of brake with brake shoes that are of identical construction, and with a greater compactness and simplicity of design and greater economy in labor of application and of material and weight. The invention consists in the improved brake and in the construction, combinations and arrangements of parts hereinafter described.

Figure 1:
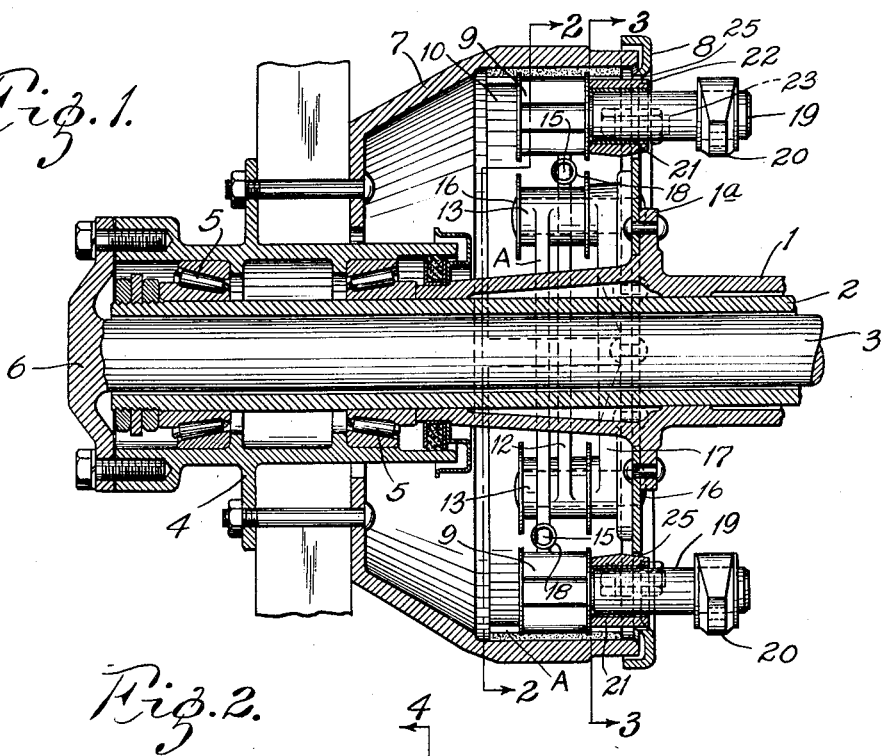
Figure 2:
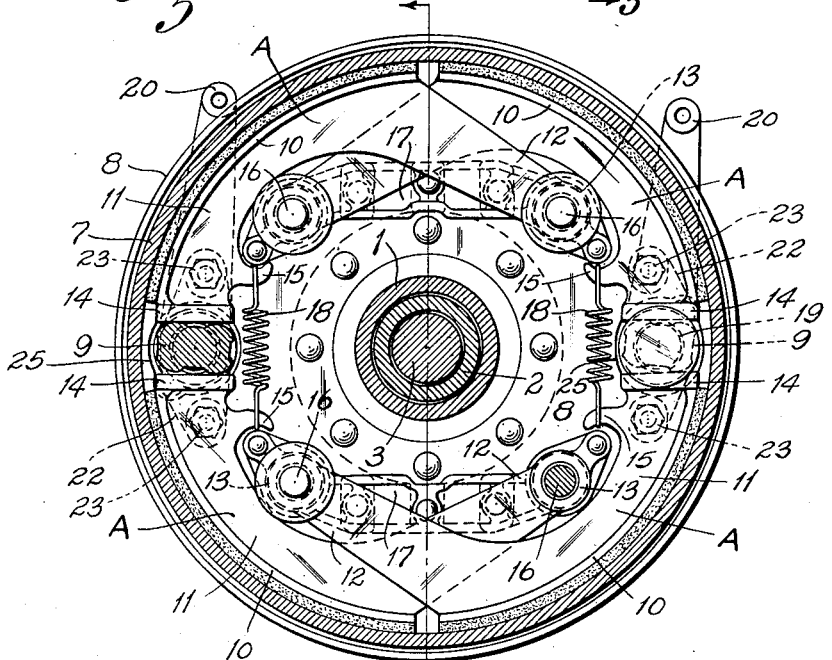

In the accompanying drawings, which form part of this specification and wherein like symbols refer to like parts wherever they occur, Fig. 1 is a horizontal longitudinal section through the end portion of an automotive driving axle equipped with a brake mechanism embodying my invention, Fig. 2 is a vertical transverse section on the line 2—2 of Fig. 1, Fig. 3 is a similar section on the line 3—3 in Fig. 1, Fig. 4 is a vertical longitudinal section on the line 4—4 in Fig. 2, Fig. 5 is a side elevational view of one of the brake shoes; and Fig. 6 is an interior edge view of said shoe.

For purpose of illustration, my invention is shown in connection with a well known type of automotive driving axle which comprises a stationary load supporting housing 1, a hollow liner 2 inside of said housing, and a driving axle shaft 3 inside of said liner. The liner 2 projects beyond the end of the axle housing 1 and has the hub of a road wheel 4 of common type mounted thereon, with suitable antifriction bearings 5 interposed between said liner and the hub of said road wheel. The road wheel 4 is driven from the driving axle shaft 3 by means of a driving disk 6, which is formed integral with the outer end of said shaft and is bolted or otherwise rigidly secured to the outer end of the hub of said wheel. A brake drum 7 is bolted or otherwise rigidly secured at one end to the inner face of the wheel; and the other or open end of said brake drum is closed by means of an annular backing plate 8, which is sleeved on the stationary axle housing 1 and is riveted or otherwise rigidly secured to a circular flange 1a thereon.

Located within the brake drum 7 is a circular series of segmental brake members or shoes A of identical construction that are adapted to frictionally engage the inner surface of said brake drum along substantially the same circumferential path on said drum. Preferably, there are four quadrantal brake members or shoes A engaging corresponding quadrants of the brake drum 7 and arranged in two pairs or sets, each pair or set comprising two adjacent shoes and the two shoes of each set being actuated by a separate cam 9 interposed between their adjacent ends.

Each brake member A comprises an arcuate shoe or flange portion 10, which is of a length slightly less than one-quarter of the circumference of the inner periphery of the brake drum 7 and has suitable brake lining material suitably secured to the convex face thereof. The arcuate shoe flange 10 is provided along its inner or concave face with an inwardly extending longitudinal strengthening rib that extends from end to end of said shoe but is offset with respect to the longitudinal center line thereof. The strengthening rib 11 is extended beyond one end of the curved shoe flange 10 to form an arm having a hub or bearing head 13 at its free end that is disposed crosswise to said rib and extends equal distances on opposite sides of the longitudinal center line of said flange. The other end of the strengthening rib 11 of the brake shoe flange 10 terminates in an abutment flange 14, which is disposed crosswise to said rib and extends equal distances on each side of the longitudinal center line of said flange. The stiffening rib 11 is provided adjacent to the abutment flange 14 with a hook portion 15. As stated above, the abutment flange 14 and the hub 13 of the brake shoe A extend equal distances on opposite sides of the longitudinal center line of the arcuate shoe flange 10, while the arm 12 is offset with respect to said longitudinal center line.

The four brake shoes A are arranged within the brake drum with their arcuate shoe flanges 10 end to end circumferentially of the drum along the same circumferential path on said drum 7; and alternate or diametrically opposite shoes are turned end for end to bring the abutment flanges 14 and the corresponding ends of adjacent shoes opposite each other. This arrangement of the brake shoes has (by reason of the offsetting of the arms 12 thereof) the effect of staggering the arms at the adjacent ends of the shoes, thereby permitting adjacent arms to cross or clear each other without interference. The hubs 14 at the ends of the arms 12 of each brake shoe are journaled on separate anchor pins 16 to permit the shoes to be swung transversely of the brake drum axis into and out of engagement with said drum. As shown in the drawings, two brackets 17 are riveted or otherwise rigidly secured to the inner face of the backing plate 8, and each bracket has two of the four anchor pins 16 mounted thereon.

The shoes that are disposed with their abutment flanges 14 opposite each other on opposite sides of a cam 9 comprise a pair or set, and the two shoes of a set are simultaneously applied to the drum when the cam cooperating with the abutment flanges at the free ends of the shoes is rocked. Coil springs 18 are secured to the hooks 15 of each set of brake shoes and serve to hold the shoe flange 10 out of engagement with the brake drum and the abutment flanges 14 in engagement with the cams 9. Each cam 9 is fixed to a rock shaft 19 provided with a brake arm 20. Each rock shaft is journaled in a bearing 21 provided therefor in a bracket 22 mounted on the backing plate 8. Each rock shaft bracket 22 is secured to the backing plate 8 preferably by means of cap screws 23, which pass through elongated slots 24 in said bracket and are threaded into said backing plate, thereby permitting the bracket to be shifted on the backing plate to adjust the position of the cam relative to the brake shoes. As shown in the drawings, the bearing 21, which supports the rock shaft, extends through an opening 25 provided therefor in the backing plate, and said opening is made large enough to permit movement of the bracket 22 to be adjusted.

By the arrangement described, the pairs of brake shoes may be selectively or simultaneously applied by a pull on either or both of the operating arms 20, which are connected in any desired manner to either a hand or foot lever. The springs normally tend to hold the shoes clear of the drum with their abutment flanges in abutting relation to the cams. The operation of the arms 20 rocks the cams 9, which operate to spread apart the free ends of the shoes cooperating therewith and thus force said shoes to swing on the anchor pins 16 outwardly into engagement with the brake drum. When the braking has been accomplished and the pull on the operating arms is released, the coil springs 18 act to pull the shoes away from said brake drum.

One of the important advantages of the above described brake construction is that all of the brake shoes are of identical construction, which is a great manufacturing advantage and also greatly simplifies the operation of mounting the shoes. The offsetting of the arms of the shoes with respect to the longitudinal center line thereof permits the arms of the shoes of one set to cross or clear the arm of the shoes of the other set without interference when alternate shoes are turned end for end, while the abutment flanges and the hubs of said shoes remain in line with the cams and pins. The cams are at a maximum distance from the center of the brake drum and are thus adapted to apply the pressure closer to the periphery of the drum, thereby securing a more effective braking action, which reduces the strains in the brake shoes and enables the shoes to be made of lighter construction.

Obviously, the device hereinbefore described admits of considerable variation without departing from my invention. Therefore, I do not wish to be limited to the precise construction shown and described. For instance, while I have described the brake as being manually operated, it is obvious that the brake may be operated by fluid actuated means.

What I claim is:

1. The combination of a brake drum, a supporting member, two pairs of identical brake members pivotally mounted on said supporting member with their pivot points substantially 90° apart and located equal distances from the drum axis and with their adjacent ends fairly close together, and an actuating cam for each pair of brake members, each member comprising a quadrantal friction portion adapted for cooperation with the drum and having a longitudinal strengthening rib on its concave side disposed entirely on one side of the longitudinal center line of such quadrant and an abutment surface at one end of such quadrant disposed crosswise of said rib, said rib being extended beyond the other end of said quadrant to form an arm disposed in the plane of said rib and rotatably mounted at one of said pivot points, the members of each pair being mounted at adjacent pivot points with their abutment surfaces parallel to each other and in operative relation to one of said actuating cams.

2. The combination of a brake drum, two pairs of pivoted identical brake members operating substantially along the same circumferential path on said brake drum with the operating surfaces of the two brake members of a pair entirely on the same side of a diameter of said brake drum, one end of each brake member of a pair being adjacent to an end of a brake member of the other pair, and cams each acting equally on said adjacent brake members, the pivot points of said brake members being spaced equally about and equal distances from the axis of said brake drum, said cams being located on a diameter of said brake drum passing midway between the pivot points of the two pairs of brake members.

MATHEW B. MORGAN.